Oct. 11, 1966    R. SANDERS    3,278,210
SELF-LOCKING TURNBUCKLE
Filed Feb. 14, 1966
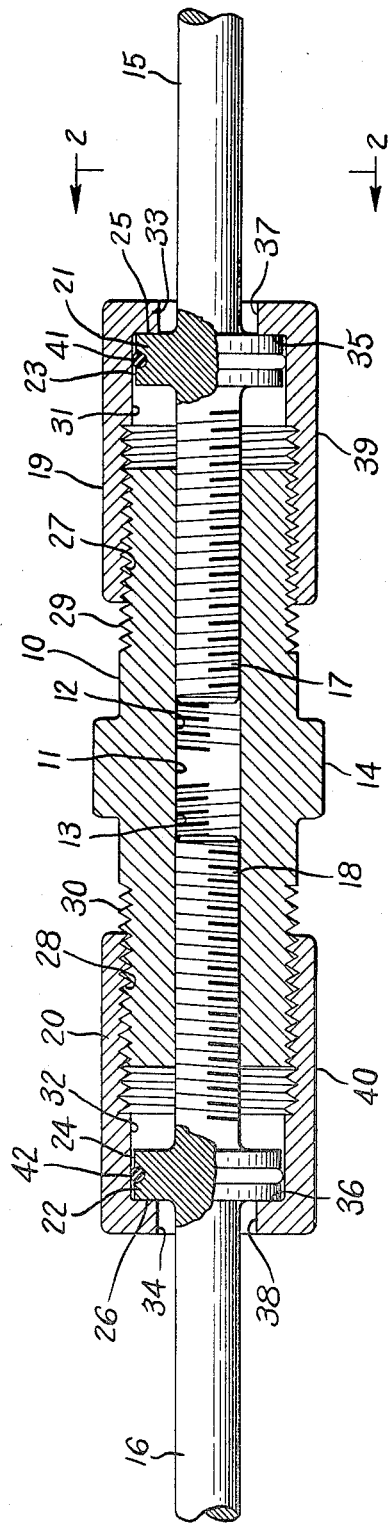
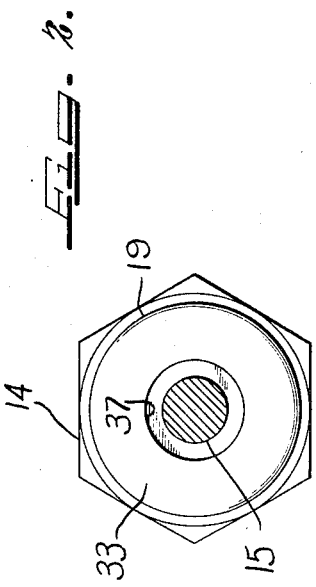
INVENTOR
RAYMOND SANDERS
BY
Charles F. Voytech
Atty.

United States Patent Office 3,278,210
Patented Oct. 11, 1966

3,278,210
SELF-LOCKING TURNBUCKLE
Raymond Sanders, 2408 W. Lunt, Chicago, Ill.
Filed Feb. 14, 1966, Ser. No. 527,337
3 Claims. (Cl. 287—60)

This invention relates to a self-locking turnbuckle.

This application is a continuation-in-part of my co-pending application Serial No. 352,442, filed March 17, 1964, now abandoned, for Self-Locking Turnbuckle.

Turnbuckles are links which are used to put in tension rods, cables, or the like, to which they are connected. In one popular form, a turnbuckle is comprised of an elongated body having a through bore therein, one end of the through bore being threaded with a right-hand thread and the opposite end of the through bore being threaded with a left-hand thread. Correspondingly threaded shafts are received in the bores, and the rod, stay or cable, is then serially connected to one of the shafts. The other shaft is usually anchored to a frame, or to another section of the rod, stay or cable. Because of the opposed hand of the threads on the shafts, turning the body in one direction will draw the shafts into the body to increase the tension on the connected rod, stay or cable, and rotation of the body in the opposite direction, will decrease the tension therein. Turnbuckles are widely used in aircraft control cables, on ships to stay masts, rigging, lifelines, or the like, and on various fixed structures. When used on aircraft, maximum strength with lowest weight and ease of operation are the principal factors in their design. When used with cable to put tension therein, either in aircraft or in other applications, the ability to maintain a predetermined tension is of paramount importance.

It has been found that in a cable of twisted wire strands which is under considerable tension, the individual strands will unwind themselves to relieve the tension therein. This unwinding tendency is transmitted to the shafts of the turnbuckle and tends to turn one of the shafts in the body of the turnbuckle in a direction to reduce the tension provided by the turnbuckle. The resulting looseness in the cable may be highly detrimental to the control setting of an airplane in which the turnbuckle may be used, or it may impose severe bending stresses on a ship's mast when the direction of force upon the mast is changed by a change in the wind direction, as by tacking.

It has been proposed to lock the shafts of a turnbuckle in place by lock nuts operating upon the threaded portions of the shafts themselves and against the body of the turnbuckle to prevent turning of a shaft in the turnbuckle, and thereby to maintain an original tension setting for the turnbuckle. Because of the high locking pressures used on the threads of the lock nut, a distortion is produced in the threads of the shaft upon reaching the locking pressure. Vibration in the cables or rods so tensioned, and the previously mentioned tendency in a cable to unwind, generally combine to gradually reduce the holding effect of the lock nut to the point where the lock nut is loose and the entire turnbuckle is then without any effective locking device. Furthermore, the distortion of the threads by the first locking effort makes a second locking of the threads difficult, and even though it may be initially effective the lock nut is thereafter sensitive to even moderate disengaging forces.

It has also been proposed to secure a locking effect by an auxiliary threaded member on the turnbuckle wherein the auxiliary threaded member is locked to a shaft by a pin passing through aligned openings in the member and shaft. Such pinned locking means, however, weaken the shaft by the material which is removed to form the opening through which the pin passes. It may also be difficult to arrive at the desired tension at the point where the sleeve and shaft openings are aligned. Furthermore, if the pin is insertable by hand for ease of assembly, it may readily work loose as a result of the vibration to which the turnbuckle is continually subjected. If, on the other hand, the pin is of a wedge or taper type design to be driven into the opening in the shaft, then two additional defects have been noted, the first being the excessive stress placed on the opening by the driven tapered pin which still further weakens the shaft at the opening, and the second, the need for a special tool with which to drive the pin in, as well as to remove the pin when the turnbuckle must be operated to take up stretch in the cable, rod or stay to which it is secured.

The principal object of this invention is the provision of a turnbuckle for cables, stays, rods, or the like, wherein locking means are used to prevent an undesired loosening of the turnbuckle, the locking means being manually manipulatable without the use of special tools, and requiring no openings in the turnbuckle shafts for locking pins, or the like, so that the shafts may be made light in weight for aircraft use.

As a more specific object this invention seeks to provide a locking means for a turnbuckle, wherein said locking means comprises an external sleeve having internal threads engaging corresponding external threads on the body of the turnbuckle, said sleeve having an inwardly turned flange at its outer end which abuts upon a cylindrical enlargement on the shaft of the turnbuckle retained within the sleeve between the flange and the end of the turnbuckle body.

A still further object of this invention is the provision of a locking means for a turnbuckle wherein said locking means cooperates to absorb some of the load normally imposed upon the threads of the shaft of the turnbuckle so that said shaft need not be made larger in diameter to compensate for the reduction in diameter occasioned by the threads and yet can provide adequate strength for the turnbuckle as a whole for the purposes intended.

These and other objects of this invention will become apparent from the following detailed description when taken together with the accompanying drawings in which:

FIG. 1 is a longitudinal cross-section through a turnbuckle and locking means constructed in accordance with this invention, and FIG. 2 is an end view of the turnbuckle of FIG. 1 taken in the direction of the arrows 2—2 of FIG. 1.

In the embodiment selected to illustrate this invention, the turnbuckle is comprised of an elongated cylindrical body 10 which may be made of corrosion-resistant material, such as brass, or, if painted, or otherwise protected from the elements, it may be made from bar steel. Said body 10 has a through bore 11 therein which has a right-hand thread 12 at its right-hand end as viewed in FIG. 1, and a left-hand thread 13 in the left-hand end thereof in said FIG. 1. The center of body 10 may be provided with an external hexagonal contour 14 for engagement with a wrench to turn the body when the turnbuckle is to be tightened or loosened.

Threaded into bore 11 from the opposite ends thereof are turnbuckle shafts 15 and 16 which may be provided with the usual loops or eyes (not shown) into which a cable, or the like, may be threaded and securely fastened against slipping. The form of the connection between the shaft and the element to be tensioned will depend upon the type of element used and will readily suggest itself to those skilled in the art.

The inner ends of the shafts 15 and 16 are provided with threads 17 and 18 respectively, said threads being right- and left-handed to match the internal threads 12 and 13. The two shafts 15 and 16 and the body 10 comprise the usual turnbuckle for linking and tensioning a cable, rod, stay, or the like, and the method of tensioning the latter comprises holding shafts 15 and 16 against rotation and turning body 10 either counterclockwise as viewed in FIG. 2 to increase the tension between the shafts 15 and 16 or clockwise as viewed in FIG. 2 to decrease said tension.

The locking means for preventing body 10 from turning relative to shafts 15 and 16 is comprised of a pair of sleeves 19 and 20 cooperating with abutments 21 and 22 on shafts 15 and 16, respectively, said abutments being preferably formed integrally therewith. Abutments 21 and 22 may be substantially identical in size and shape, and each is preferably of cylindrical external contour, abutment 21 having a cylindrical surface 23 and abutment 22 having a cylindrical surface 24. Thus, each shaft 15 and 16 may be made from bar stock which is of substantially the diameter of the cylindrical surfaces 23 and 24 and which is turned down to the diameter of the threaded portions within body 10. The axial dimension of each abutment 21 and 22 is such as to have the necessary strength to take the entire tension force that may be imposed upon each of the shafts 15 and 16. The side of each abutment 25 and 26 away from the threads 17 and 18, respectively, is preferably made square with the axis of the turnbuckle shafts for a reason which will be made apparent hereinafter.

Each sleeve 19 and 20 has an internally threaded portion 27, 28, respectively, which engages external threads 29 and 30, respectively, on the ends of the body 10. Threads 29 are of opposite hand to the threads 12 and are therefore left-handed. Threads 30 are of opposite hand to threads 13 and are therefore right-handed. The threads 27 and 28 are correspondingly left- and right-handed, respectively. At the end of each threaded region 27 and 28 is a cylindrical region 31 and 32 which is preferably of smaller diameter than the smallest diameter of the threads 27 and 28, respectively. The external diameter of the abutments 21 and 22 is slightly less than the diameter of the cylindrical portions 31 and 32, respectively, so that slip-fit is established between the abutments and sleeves. Thus the abutments serve as supports for the sleeves and conversely the sleeves tend to absorb any accidental lateral thrust which may be impressed upon the shafts 15 and 16.

The outer ends of sleeves 19 and 20 are provided with inwardly extending flanges 33 and 34, each of which flanges has a radially disposed surface 35 and 36, respectively, abutting upon the sides 25 and 26 of the abutments 21 and 22. The thickness of each flange, measured in an axial direction, is calculated to be such as to provide sufficient strength to absorb all of the tension force which may be impressed upon the associated shaft. The openings 37 and 38 formed by the inner ends of the flanges 33 and 34 are sufficiently large to allow any eye or other fastening device on the shafts to pass therethrough, as is required in the initial assembly of the device.

The external surfaces 39 and 40 of the sleeves 19 and 20 may be knurled so that the sleeves may be turned by hand. Alternatively, the outer surfaces may be provided with flats or other configurations (not shown) for engagement by tools in the larger sizes of the turnbuckle.

It is contemplated that the shafts 15 and 16 will be furnished with the sleeves 19 and 20 already assembled thereon between the eyes or the like on the shafts and the abutments 21 and 22. The turnbuckle is then applied to the cable or the like by securing the shafts to their points of attachment to the cable and to an anchoring point, and the body 10 is threaded over the threads 17 and 18 of the shafts and turned to draw the shafts 15, 16 together to tension the cable. When the desired tension is reached in the shafts, the sleeves 19 and 20 are moved toward the body and the threads 27 and 32 are made to engage the threads 29 and 30 of the body. The sleeves are turned in the directions which advance the sleeves upon the body, until the flange 33 strikes abutment 21 and flange 34 strikes abutment 22. The sleeves are then made as tight as desired and the shafts are accordingly locked against rotation by the friction created between the radial surfaces 35 and 36 of the sleeves on the one hand and the sides 25 and 26 of abutments 21 and 22, respectively, on the other hand. Any tendency for the shafts to loosen and turn the sleeves will cause said sleeves to tend to advance farther upon the body 10 in the opposite direction and thereby resist the outward movement of the shafts. Should the shafts turn even slightly, the tension is then transferred to a large extent from the threads 17 and 18 to the threads 27 and 28 on the sleeves, so that said sleeves serve to augment the holding power of the turnbuckle and comprise, in effect, a second turnbuckle.

Where the turnbuckle is used in salt water, or in water which has considerable sand and silt in it, such water and silt can be kept from entering the threads 17 and 18 from around the abutments 21 and 22 by O rings 41 and 42 received in appropriate grooves formed peripherally in the cylindrical surfaces 23 and 24 of the abutments 21 and 22.

I claim:

1. In combination, a turnbuckle and locking means therefor, said turnbuckle comprising an elongated body having a bore extending longitudinally through said body, right-hand threads in one end of said bore and left-hand threads in the opposite end of said bore, external left-hand threads on the said one end of said body, external right-hand threads on the said opposite end of said body, and threaded tension-receiving shafts received in the said one and opposite ends of said bore and engaging the threads in said ends of the bore; and said locking means comprising radially outwardly extending abutments one on each of said shafts axially removed from the threads on said shafts, said abutments being fixed against axial and rotary motion on said shafts, internally threaded sleeves engaging the external threads on the body, and radially inwardly extending walls on said sleeves adapted to rotate relative to and engage said radially outwardly extending abutments on the shafts on the sides of said abutments remote from said body, whereby to prevent axial movement of said shafts outwardly of said body beyond said walls.

2. The combination described in claim 1, said abutments being integral with the shafts and said inwardly extending walls comprising flanges formed integrally with the sleeves.

3. The combination described in claim 1, said abutments being circular in contour and of a diameter substantially the same as the inner diameter of the sleeves adjacent the radially inwardly extending walls on said sleeves, whereby the sleeves provide radial support for the shafts.

References Cited by the Examiner

UNITED STATES PATENTS

| | | | |
|---|---|---|---|
| 1,711,598 | 5/1929 | Hardick | 287—60 |
| 2,678,226 | 5/1954 | Wright | 287—60 |

CARL W. TOMLIN, *Primary Examiner.*

D. AROLA, *Assistant Examiner.*